US012669396B2

(12) United States Patent　　　(10) Patent No.:　US 12,669,396 B2
Culotta　　　　　　　　　　　　　　(45) Date of Patent:　Jun. 30, 2026

(54) TORQUE VALUE ADJUSTMENT SYSTEM FOR USE WITH CLICK TYPE TORQUE WRENCHES TO MINIMIZE REPETITIVE MOTIONS

(71) Applicant: Disney Enterprises, Inc., Burbank, CA (US)

(72) Inventor: Kenneth Wayne Culotta, Maitland, FL (US)

(73) Assignee: Disney Enterprises, Inc., Burbank, CA (US)

( * ) Notice: Subject to any disclaimer, the term of this patent is extended or adjusted under 35 U.S.C. 154(b) by 560 days.

(21) Appl. No.: 18/107,685

(22) Filed: Feb. 9, 2023

(65) Prior Publication Data

US 2024/0272028 A1　　Aug. 15, 2024

(51) Int. Cl.
*G01L 25/00*　　　(2006.01)
*B25B 23/142*　　(2006.01)
(52) U.S. Cl.
CPC ........ *G01L 25/003* (2013.01); *B25B 23/1427* (2013.01)
(58) Field of Classification Search
CPC ........................... G01L 25/003; B25B 23/1427
USPC ................................................. 73/1.09, 1.12
See application file for complete search history.

(56) References Cited

U.S. PATENT DOCUMENTS

| | | | | |
|---|---|---|---|---|
| 2011/0023576 A1* | 2/2011 | Mountz | ..................... | G01L 5/24 |
| | | | | 73/862.21 |
| 2013/0029304 A1* | 1/2013 | Vallejo Manyari | ..... | B43L 5/005 |
| | | | | 434/300 |
| 2016/0031070 A1* | 2/2016 | Ball | .................... | B25B 23/1427 |
| | | | | 81/479 |
| 2016/0305607 A1* | 10/2016 | Kyo | ......................... | F16D 3/84 |

(Continued)

FOREIGN PATENT DOCUMENTS

| CN | 105203257 B | 9/2018 |
|---|---|---|
| CN | 210571166 U | 5/2020 |

(Continued)

OTHER PUBLICATIONS

Sushma Industries Pvt Ltd. "Torque Wrench Calibration System—Automated." Sushma Industries, 2016-2022, https://sushmaindustries.com/product/torque-wrench-calibration-system-automated-206/.

(Continued)

*Primary Examiner* — Peter J Macchiarolo
*Assistant Examiner* — John M Royston
(74) *Attorney, Agent, or Firm* — Foley & Lardner LLP

(57)　　　　　　　ABSTRACT

A system for adjusting torque value settings on click type torque wrenches. The system is configured to limit repetitive motions by an operator including limiting repetitive wrist movements to rotate a wrench handle, while also providing a very portable and easy to use system with built-in safety features. The system includes an electric motor or driver that is operable, e.g., by manual movement of a lever on a controller or control signals from a digital controller, to (Continued)

rotate the head of the wrench while the operator holds the wrench handle in an unlocked configuration. The operator inserts the head of the wrench into an adaptive, self-centering chuck provided at the output of the electric motor. A tool rest extends from a base of the system at an end opposite the mounting chuck, and this rest is configured to support the body of the wrench parallel to the motor shaft.

23 Claims, 10 Drawing Sheets

(56)                    References Cited

U.S. PATENT DOCUMENTS

| | | | |
|---|---|---|---|
| 2018/0369997 A1* | 12/2018 | Chen | B25B 13/463 |
| 2025/0271321 A1* | 8/2025 | Kang | G01L 5/24 |

FOREIGN PATENT DOCUMENTS

| | | |
|---|---|---|
| CN | 212320991 U | 1/2021 |
| CN | 215036980 U | 12/2021 |
| KR | 101104671 B1 | 1/2012 |
| KR | 102330784 B1 | 11/2021 |

OTHER PUBLICATIONS

CDI Torque Products. "CDI Motorized Multitest Torque Calibration System—2800-1." Pro Torque Tools, 2023, https://www.protorquetools.com/cdi-motorized-multitest-torque-calibration-system-2800-1/.

AKO Torque Specialties. "TSD1020 Le Twister System Accessory." Nov. 2022, https://akotorque.com/wp-content/uploads/2021/08/TSD1020-LeTwister.pdf. Pamphlet.

* cited by examiner

TORQUE VALUE ADJUSTMENT SYSTEM FOR USE WITH CLICK TYPE TORQUE WRENCHES TO MINIMIZE REPETITIVE MOTIONS

BACKGROUND

1. Field of the Description

The present description relates, in general, to click type torque wrenches and use of such wrenches, and, more particularly, to a system or device designed to minimize a user's repetitive motions when using (e.g., setting torque values during quality assurance testing and other applications) click type torque wrenches.

2. Relevant Background

There are numerous applications where it is important to tighten fasteners, such as a nut on a bolt, to a specific tightness. A torque wrench is a tool used to apply a specific torque to a fastener such as a nut or a bolt. It is usually in the form of a socket wrench with an internal mechanism which will indicate (as by 'clicking') a specific movement of the tool handle in relation to the tool head) when a specified, typically adjustable by the user, torque value has been reached during application.

Click-type torque wrenches are so named because of the 'click' that is both heard and felt as the ratchet arm, which extends inside the tubular body of the torque wrench, strikes the inner wall of the tool when a set torque value is reached. This type of torque wrench is quite popular because the mechanism is accurate and reliable, providing, of course, that the wrench is properly maintained and checked.

In use, click type wrenches are set by rotating a knurled handle to a desired torque value that is typically given in pounds-foot or similar units. More specifically, click type torque wrenches operate by rotating the handle, which applies a spring force against a pawl or tilt block, thereby increasing its resistance to tilting when a torquing action is applied to the wrench by a user to tighten a fastener. To help minimize the number of rotations given to the handle, the load screw is generally designed with a course thread pitch. The thread pitch is defined as the number of rotations required to travel a distance and, in standard measurements, that distance is one inch. As a result of this design, for example, if a load screw on the torque wrench has a thread pitch of fourteen, it will require the handle be to be given fourteen rotations to travel one inch.

Despite the use of course thread pitches, an operator must still rotate the handle numerous times to adjust the torque value (or torque value setting as these terms may be used interchangeably herein) for use and for quality assurance testing or checks. An operator has to perform numerous repetitive motions with their wrist to adjust the torque value setting, which can be tedious and time consuming and can lead to possible repetitive motion injuries over time.

A typical torque wrench spring may have to be compressed about one and a half inches to adjust it from its minimum to its maximum torque value setting. For example, a torque wrench with a rating of 250 pounds-foot of torque would require that the torque wrench handle be rotated twenty full turns to bring the wrench from its lowest value of 50 pounds-foot to its highest value of 250 pounds-foot. The human wrist is not capable of imparting a full rotation on the wrench handle. In fact, the human wrist can only rotate about ninety degrees at best. Therefore, the wrench user or operator has to impart a greater number of smaller rotations on the wrench handle to achieve the goal or target number of full rotations to adjust the wrench. Moreover, the user or operator, using both wrists simultaneously, must impart 40 to 45 smaller rotations in order to bring the spring in the click type torque wrench to its full compression at maximum torque value. It will be understood by operators and wrench designers and manufacturers that the force required to rotate the wrench handle also increases with the distance traveled.

As stated before, the accuracy of the torque wrench is affected by not only how well the torque wrench has been maintained, but also by its use, as its parts are subject to wear. It is vitally important that the wrench be inspected for accuracy on a periodic basis or after repair. Standards require that the torque wrench be checked in both the clockwise, and counter-clockwise directions. That means the wrench must be: (a) brought to its maximum torque value; (b) brought to its minimum torque value; (c) advanced to its maximum torque value in at least three steps; (d) returned to its minimum value; (e) advanced to its maximum torque value (for the counter-clockwise inspection) in at least three steps, and finally; (f) returned to its minimum value for proper storage (which is also expected for field use of such wrenches to insure ongoing proper operations with desired precision). In total, this means an operator, in checking a typical 250 pounds-foot torque wrench, would have to rotate the wrench handle anywhere from 240 to 270 turns to check a single wrench, and this task can become quite arduous for those who are in the business of checking multiple wrenches in their facilities.

Some efforts have been made to make adjustment of torque values for click type torque wrenches a less manual process, but these efforts have only met with very limited success or industry acceptance. For example, devices have been produced for adjusting the torque value settings of click type torque wrenches. These devices have operated on the basis of rotating of the wrench handle, with the operator manually or the device components holding the operating end or wrench head in a fixed or non-rotating position.

In one device, the operator also has to manually move the lock ring adjacent the barrel to allow the micrometer barrel or wrench handle to rotate freely while also manually pushing the wrench handle into a metal barrel, being lined with an elastomeric material having a conically shaped recess, with enough axial force so as to achieve a proper frictional mating with the rotation device It is to be understood that this elastomeric material is subject to wear and deterioration and must be replaced periodically. In addition, not only must the operator use both hands to hold the wrench, he must also stand an employ the use of one foot to actuate the switches that control the drive motor. Aside from the fact that the human foot cannot easily provide the sensitivity and control the human hand can deliver, the arrangement greatly inhibits the versatility and portability of the device. Another torque value adjustment device is relatively complex to use with the operator having to expose the adjusting rod, secure the head of the wrench, position a rear stop lever so that it functions to move the lock ring to release the micrometer barrel, slide the rotation assembly with its drive motor forward, and operate the clamping jaw to grip the wrench handle (or adjusting rod) for rotation. These steps must be reversed upon completion of torque value adjustment operation, including reassembly of the micrometer end of the torque wrench. This device is also not designed to be portable such that the wrenches must be brought to its location. Further, none of the currently available torque adjustment devices are suited for locking arrangements located at the end of the micrometer barrel and only work with lock rings or similar locking configurations.

Hence, there remains a need for an improved device for adjusting torque value settings on click type torque wrenches that limits the need for repetitive motions by its users.

SUMMARY

A new system is presented herein that is useful for adjusting torque value settings on click type torque wrenches. The system is configured to limit or even minimize repetitive motions by an operator including limiting repetitive wrist movements to rotate a wrench handle, while also providing a very portable and easy to use system with built-in safety features.

In some embodiments, the system includes an electric motor or driver that is operable, e.g., by manual movement of a lever on a controller or control box, via control signals from a digital controller, and so on, to rotate the head of the wrench while the operator holds the wrench handle in an unlocked configuration or state, which causes the handle of the wrench to be placed in a desired position or for the wrench to have a desired torque value setting. The operator simply inserts the head of the wrench into an adaptive (e.g., self-centering) chuck provided at the output or rotatable end of the electric motor/driver, which in one prototype took the form of a standard or off-the-shelf, handheld drill motor.

A tool rest extends from a base or platform of the system at an end opposite the mounting chuck, and this rest is configured to support the body of the wrench parallel to the output or drive shaft of the motor/driver. The lever, which is operatively connected to the motor/driver controller (e.g., a drill motor's trigger), serves as one means to apply precise and controlled electric power to the motor/driver. The system is configured to be able to reverse the direction of the motor and its output or drive shaft, such that an operator can return the wrench handle to its original (e.g., minimum) position. For safety, the system may include a cylindrical (and hollow) guard that is positionable, e.g., by the operator manually pivoting the guard from a storage position to a use/operating position, to surround the adaptive chuck during its rotation. To operate the system or device, the operator retracts (e.g., slides or pivots) the guard away from the adaptive chuck to provide access to mount a wrench head. The adaptive chuck is configured, e.g., with one or more slots, to be able to receive and retain any size torque wrench drive.

The system is configured for safety purposes such that it will not operate while the guard is in the retracted position. To this end, the guard may be mounted to a block that is slidably coupled to or mounted upon the base of the system. The movement of the block on which the guard is pivotally mounted to an operating position causes a pushrod underneath the block within a groove in the base to come into contact with a momentary switch located within the motor controller or control box, which closes a circuit and allows power to be provided to the motor/driver. As an additional safety feature, the system is designed such that the pushrod has to be urged to move a predefined distance (e.g., pushrod travel distance). In some implementations, this amount of travel occurs when the guard is in a fully upright (or operating) position, such that a lever that is operatively connected to the tilting or pivoting guard will further extend the pushrod a predefined distance or length, thereby allowing the pushrod to properly engage the momentary switch.

Should the guard be accidentally tilted forward by a small degree while the device is in operation, the pushrod will retract and immediately cause the motor to be deprived of electric power.

For storage, the adaptive chuck guard can be pivoted or tilted downward from its vertical operating position in which it wraps around the chuck to a horizontal storage position proximate to or mating with the upper surface of the base with the system's power cord coiled inside the guard. The adjustable rest (e.g., "adjustable" with regard to its linear position on the base defining its distance from the chuck to facilitate use of the system with wrenches of differing lengths) may also be configured to be retracted to facilitate storage.

More particularly, a system for adjusting a torque value of a click type torque wrench. The system (or device) includes a chuck configured for receiving and retaining a head (or driver end) of a click type torque wrench. The system also includes a motor with a drive shaft coupled to the chuck such that the drive shaft and chuck rotate together. A controller is also included that is configured to operate, in response to input from a user, to control the motor to rotate in a user-selectable direction to rotate the drive shaft. In operation, the chuck and the received head of the click type torque wrench and integral wrench body are rotated to adjust the torque value of the click type torque wrench with the handle concurrently restrained from rotation by the user and a locking mechanism released by the user.

In some embodiments, the chuck is self-centering and includes jaws with one or more slots configured for receiving one or more differently sized drivers on the head. In such embodiments, the system may include a base supporting the chuck and the motor from a top surface, and the system also may include a tool support configured to support the wrench body at a location proximate to the handle in a parallel alignment with the drive shaft of the motor (e.g., such that the longitudinal axis of the body of the wrench coincides with the longitudinal axis of the drive or output shaft of the motor). A variety of electric motors may be used such as those allowing for manual direction and power (or speed) control based on user input received at the controller. In other cases, the motor is a stepper motor and the controller provides digital control signals to cause the motor to rotate the drive shaft a predefined number of turns to set the torque value of the click type torque wrench The system may also include a guard with a hollow cylindrical body, and the guard can be pivotally coupled with the base so as to be pivotal between a horizontal position in which the guard is spaced apart from the chuck and a vertical upright position in which the hollow cylindrical body extends about the chuck at least partially blocking access to the chuck. In such implementations, the system may include a safety interconnect between the guard and the controller configured to enable operation of the motor by the controller to rotate only when the guard is in the vertical upright position. Additionally, the guard can be further supported on the base to be slidable between a first linear position proximate to the motor and a second linear position spaced apart from the motor and proximate to the chuck.

The safety interconnect may be configured to only enable operation of the motor when the guard is in the second position and is in the vertical upright position. Additionally, the guard may be pivotally supported on a block that is configured for sliding upon the base. Then, the safety interconnect can include a momentary switch for completing a circuit in the controller and further comprises a pushrod housed in a channel in the base, and the pushrod may be moved into contact with the momentary switch only when the block is slid to move the guard to the second linear position and the guard is pivoted into the vertical upright position.

DETAILED DESCRIPTION OF THE PREFERRED EMBODIMENTS

Briefly, the following description describes a system or device that is configured for use in setting or adjusting the torque value of a click type torque wrench. The system is designed to relieve some of the physical requirements when manually operating a click type torque wrench to check or set the torque value so as to minimize or at least limit the number of repetitive motions that can lead to strain or even injury of an operator's wrist. The following description will begin with a discussion of one useful embodiment of the new system used to provide a working prototype and proof of concept. Then, with the understanding of that specific embodiment understood, the discussion will turn to a more general implementation of the inventor's ideas for a torque value adjustment system for click type torque wrenches with reference to a functional block diagram of the system.

From this description, it will be clear to the reader that the system provides several very useful and desirable advantages over manual adjustment and over prior systems in which the handle or portions of the handle end of the wrench were rotated by a motor-based assembly. As compared to prior devices, the new system does not require the exposure or removal of any parts. During operations of the inventor's system, the operator grasps or manually restrains the handle and operates the lock ring or other locking mechanism in or near the handle of the wrench, and, as a result, the system is useful with any locking arrangement implemented for the micrometer barrel of a click type torque wrench.

Additionally, set up and break down of the system are simple and can be performed by an operator very rapidly, as the operator merely has to engage the drive of the torque wrench in a pre-sized slot, bring the alignment plates on the adaptive (or self-centering) chuck together so as to position the head of the wrench in an axial alignment with the electric motor's output or drive shaft, and rest the body of the torque wrench on the rest support that is spaced apart an adjustable distance on the system base from the chuck and which may be adjustable in height to provide the desired parallel alignment of the torque wrench body and the motor shaft. To remove the torque wrench from the system after adjustments in torque value settings, the operator merely slides it away.

Figure 1:
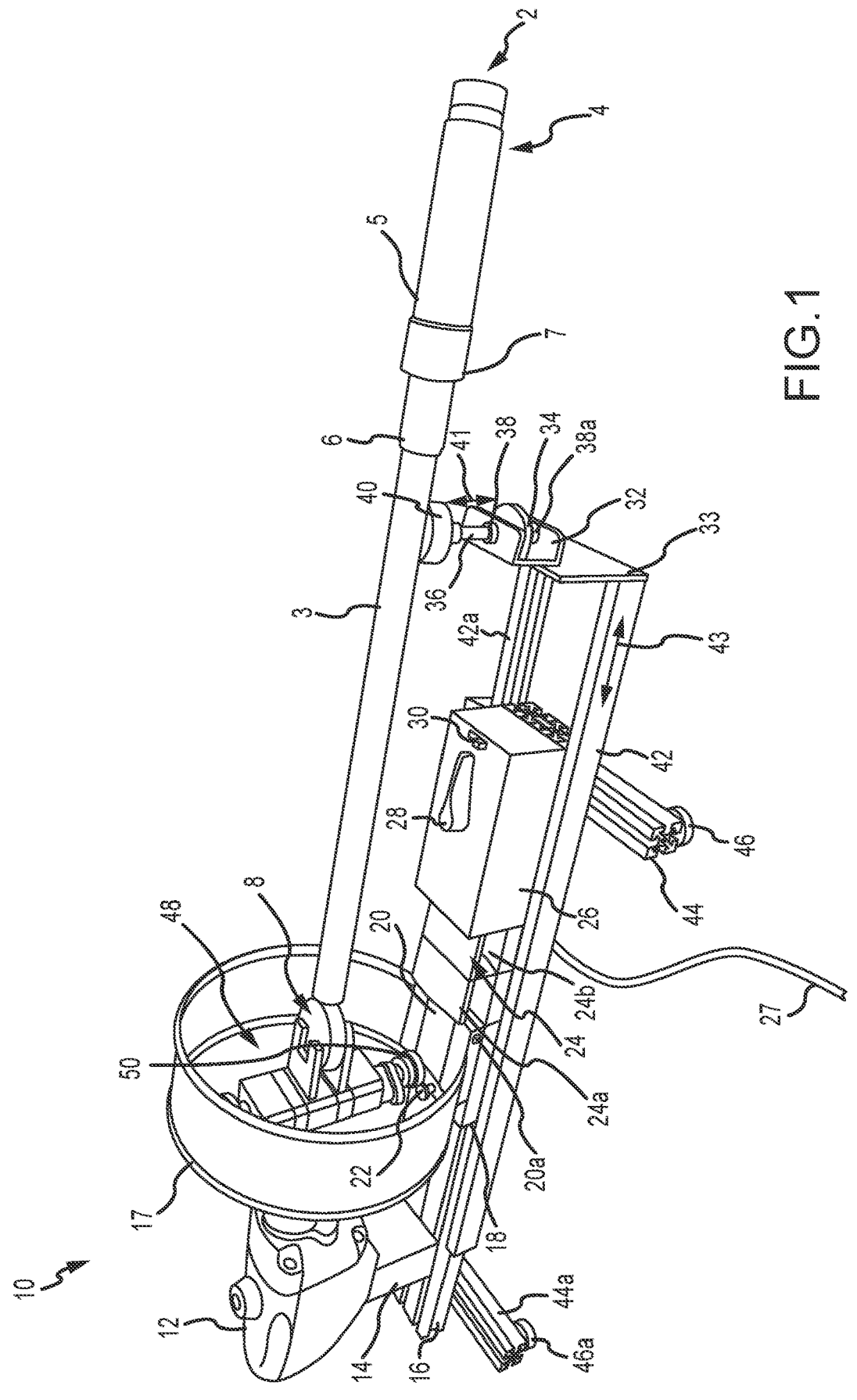
FIG. 1 illustrates a side perspective view of a torque value adjustment system of the present description showing the system in an operations-ready state or mode for adjusting torque values for a click type torque wrench.

FIG. 1 illustrates a side perspective view of a torque value adjustment system 10 of the present description showing the system 10 in an operations-ready state or mode for adjusting torque values for a click type torque wrench 2. The wrench 2 is of conventional design and includes an elongated cylindrical bar-shaped body 3 that extends from a first end upon which a handle 4 is provided to a second end upon which a head 8 with a driver or drive element (e.g., for engaging a socket) is provided. The head 8 is shown to be supported by the system/device 10 while the body 3 is supported at a location near (e.g., within 8 to 12 inches or the like) the second end and handle 4 via a tool rest 40 (which, as explained below, has an adjustable height and linear position relative to the chuck 48), with the body 3 parallel to (and, in some embodiments, coinciding with) an output or drive shaft (or its longitudinal axis) of the motor 12.

Adjacent the handle 4 of the wrench 2 is a lock ring 5, which is operated by an operator (not shown) to allow a barrel 7 to rotate relative to the body 3 and set a torque value of the wrench 2 during operations of the system 10. The torque value or torque value setting of the wrench is shown with visual indicator portion 6 on the body 3. During use, a human user or operator would grip the handle 4 to restrain its movements or rotation while operating the lock ring 5. The system 10 is also useful with click type torque wrenches having differing locking mechanisms including those located at the end of the handle as these can also be operated manually by the operator of the system 10.

The system 10 is designed to be readily portable in that it is lightweight and does not require mounting to a wall or supporting table. To this end, the system 10 includes a base 16, which may be rectangular and formed of a metal or other durable material. A pair of elongated support arms or members 42, 42a extend in a parallel and spaced apart matter from the base 16, and, as shown with arrow 43, the arms 42, 42a are coupled with the sides of the base 16 so as to be slidable or extendable so as to allow adjustment of their lengths so as to better accommodate wrenches of differing lengths. The arms 42, 42a and base 16 are vertically supported from below by front and rear base supports 44, 44a, which may optionally include feet or pads 46, 46a on lower surfaces (e.g., two or more rubber or plastic pads per support 44, 44a) to limit skidding of the system 10 during use and damage to any supporting surfaces.

To eliminate the need for manual rotation of the wrench 2, the system 10 includes a motor or drive 12 that is affixed in a rigid manner to the base 16 via a motor support/mount 14. A variety of motors/drives may be used in the system 10, with it being useful for it to be a variable speed electric motor/drive in some embodiments to allow an operator to control the speed of rotation of the wrench drive/head 8 and, hence, body 3. It is also desirable in many implementations for the motor/drive 12 to be reversible to allow the direction of rotation to be selectable and switchable so as to support rotation of the wrench head 8 and body 3 in a clockwise and in a counterclockwise direction to support loading and unloading (or increasing and decreasing torque values). In one prototype, a motor of an off-the-shelf hand drill was used for the motor/drive 12 (as shown in FIG. 1), but, in production implementations of the system 10, it is likely other electric motors will be used for motor/drive 12 including stepper motors and the like.

To allow the use of the drive/motor 12 to rotate the wrench head 8 and interconnected body 3, the output or drive shaft of the motor/drive 12 is coupled to an adaptive chuck 48. The chuck 48, as explained in more detail below, is configured with jaws having one or more slots sized and shaped to receive drivers of one or more matching sizes. In other words, the chuck 48 is designed to receive any conventional wrench head that may have differing sized drivers with ⅜-inch, ½-inch, ¾-inch, and 1-inch drive sizes being common.

The chuck 48 is also configured to be self-centering, and, in the embodiment of FIG. 1, the chuck 48 includes an adaptive chuck adjustment knob 50 that can be used to open and close the chuck jaws in a matching and concurrent manner so as to center the head 8 in the chuck 48. This aligns the head 8 with the output/drive shaft of the motor 12 such that the longitudinal axis of the body 3 is parallel to this shaft or, in many cases, coincidental. The system 10 further includes a tool rest 40 mounted to ends of the support arms 42, 42a opposite the motor 12, and the rest 40 is provided to support the body 3 of the wrench 2 to retain the desired alignment of the body 3 with the output or drive shaft of the motor 12 when the wrench head 8 is received within the chuck 48. The tool rest 40 extends orthogonally upward from the support arms 42, 42a, and its height above the support arms 42, 42a is adjustable via the mounting assembly that is made up of, in this example, of an adjustable height bracket 32, a threaded height adjustment knob 34, a height adjustment screw 36 (upon which the rest 40 is supported), and upper and lower adjustment screw guides 38, 38a. The linear distance or separation from the chuck 48 and the tool rest 40 is adjustable as shown with arrow 43 by moving the bracket support plate 33, which is rigidly affixed to the outer end of the slidable support arms 42, 42a and also to the adjustable height bracket 32. In this way, the system 10 is useful with a relatively large range of lengths (e.g., all conventional wrench lengths) for wrench body 3.

The system 10 further includes a controller/control box 26 adapted for providing an operator manual control over the motor/drive 12. The control box 26 is attached to the base 16, and a power cord 27 is included in the system 10 to connect the control box 26 to an external power source (e.g., a wall socket, a battery, a generator, or the like). The control box 26 is, in turn, coupled to the motor 12 to selective provide it with power to control its speed as well as with control signals to set or switch the direction of rotation of its output or drive shaft. In this regard, the controller/control box 26 is shown to include an input element (e.g., a slidable switch lever) 30 (see FIG. 4) for setting the direction of rotation in a clockwise or counterclockwise direction that may correspond with loading or unloading torque from the wrench 2. Additionally, the controller/control box 26 is shown to include a second input element (e.g., a rotatable lever or a knob in other implementations) 28 that an operator can use to control the speed of rotation of the motor 12, with it being useful in some case for the lever 28 to be move in either direction from a minimal or zero power input location so that an operator can be on either side of the device 10 and easily operate the controller 26 (e.g., from no power (or no rotation) to full power (or maximum rotation) or the like).

The system 10 is adapted to include a number of safety features. Specifically, the system 10 includes a guard 17 that is shown in FIG. 1 in its vertically upright position in which the system 10 is allowed to operate (e.g., rotate chuck 48 with motor 12). In this upright or operating position, the guard 17 has a cylindrical, hollow body with a height and inner diameter (ID) that allows it to fully or at least partially enclose or extend about the chuck 48, and the guard 17 may be fabricated of a rigid material such as a plastic, a metal, or the like and have a thickness to be rigid and strong enough to resist compression of a predefined magnitude.

Further, as explained in more detail below, the guard 17 is interconnected with the controller 26 such that the controller 26 can only operate or provide power to the motor 12 and rotate the chuck 48 when the guard 17 is fully in the vertical or upright operating position (as shown in FIG. 1). In other positions, the motor 12 is inoperable. In brief, the guard 17 is mounted on a support block 18 that is slidably coupled with an upper surface of the base 16 such that the block 18 can be slid away from the motor 12 as shown to place the upright guard 17 adjacent and about the chuck 48, and the block 18 can also be slid toward the motor 12 and away from the controller 26 and toward the motor 12 to expose the chuck 48 and provide a user access to its jaws and adjustment knob(s) 50 (and for use in placing the system 10 in a storage configuration with minimized overall length). The guard 17 is also pivotally coupled with the base 16 via a pivoting guard mounting block 20 with its pivot point 20a, with the block 20 being locked in place to the base 16 with a spring-biased locking pin 22. During use, an operator lifts up on the pin 22 to release the block 18 from the base to allow it to be slid into and out of the position shown in FIG. 1. The operator can also pivot the guard 17 relative to the base 16 by operation of the pivoting mounting block 20 and its pivot point 20a. When the block 20 is pivoted to position the guard 17 into its upright, vertical position and the block 18 is slid outward from the motor 12 and toward the controller 26 to the operating position (or maximum travel point away from the motor 12), the controller 26 is configured and operable to power and control direction of the motor 12.

The system 10 is also configured for convenient and compact storage. Particularly, the sliding arms 42, 42a may be slid as shown by arrow 43 from the extended or operating position after the wrench 2 is removed, and this reduces the overall length of the system 10 (e.g., to a length matching the length of the arms 42, 42a or nearly so). The guard 17 is slid back away from the controller 26 by sliding the block 18 on the base 16 toward the motor 12. The system 10 further includes a cord keeper assembly 24, which includes a fixed member 24b provided adjacent the control box/controller 26 on the base 16 and a sliding member 24a coupled to the slidable guard support 18 so as to move with the block 18 on the base 16. The members 24a, 24b may take the form of two halves of a spool or other useful shape for receiving the power cord coupled to the controller 26 when the system 10 is not in use). The guard 17 is pivoted from the upright, vertical position to a down, horizontal position in which it extends around the members 24a, 24b of the cord keeper assembly 24 by pivoting the block 22 about its pivot point 20a.

At this point in the description, it may be useful to provide a review or summary of several of the more significant aspects of the device or system 10. With reference to FIG. 1, it can be seen that the system or device 10 is designed to set or rest upon, but not necessarily be attached to, a flat surface such as table. Some of the main components of the device 10 are mounted on base 16, which is supported from a table, floor, or other surface by means of base supports 44 and 44a, in conjunction with base support feet 46 and 46a. An electric motor 12 is fixably mounted to base 16 by motor support 14, such that a rotative force can be provided by operation of the motor to the adaptive chuck 48 whilst also providing the proper rotational clearance for adaptive chuck 48 above base 16.

As shown in FIG. 1, a guard support block 18, is slidably mounted to the base 16, and it serves to provide a means for guard mounting block 20, along with guard 17, to hinge upon or pivot about point 20a. The purpose of this arrangement is to allow for guard 17 to be kept in a vertical position for operation whilst also allowing for guard 20 to be tilted substantially horizontally for storage. Guard 17 is of such diameter and size as to provide a protective means from the rotational movement of adaptive chuck 48, along with knob 50, from undesired interference whilst in operation. Locking pin 22 provides guard support block 18 a means to remain in a desired, fixed position along base 16. Adjacent to guard support block 18 is a power cord keeper 24. First member or halve 24b is fixably mounted to base 16. The second member or half 24a of the power cord keeper 24 is mounted to guard support block 18 and, in conjunction with power cord keeper member 24b, provides a stowage means for the cord providing electrical power to motor 12 when the device is to be stored.

Adjacent to the power cord keeper 24 is control box 26, which provides several operative components useful for controlling operations of the motor 12 including a motor power lever 28 and a motor directional switch 30. Support plate 33 is perpendicularly attached to sliding arms 42 and 42a. Support plate 33 not only allows for unified movement of sliding arms 42 and 42a, but it also serves as a mounting means for tool rest 40 along with its related components including the height adjustment bracket 32, the height adjustment screw 36, the adjustment screw guides 38 and 38a, and the height adjustment knob 34. It should be understood that movement of sliding arms 42 and 42a, residing in close proximity to base 16, will cause the tool rest 40 to travel a longitudinal path in relation to the base 16 and, in particularly, to adaptive chuck 48.

Figure 2A:
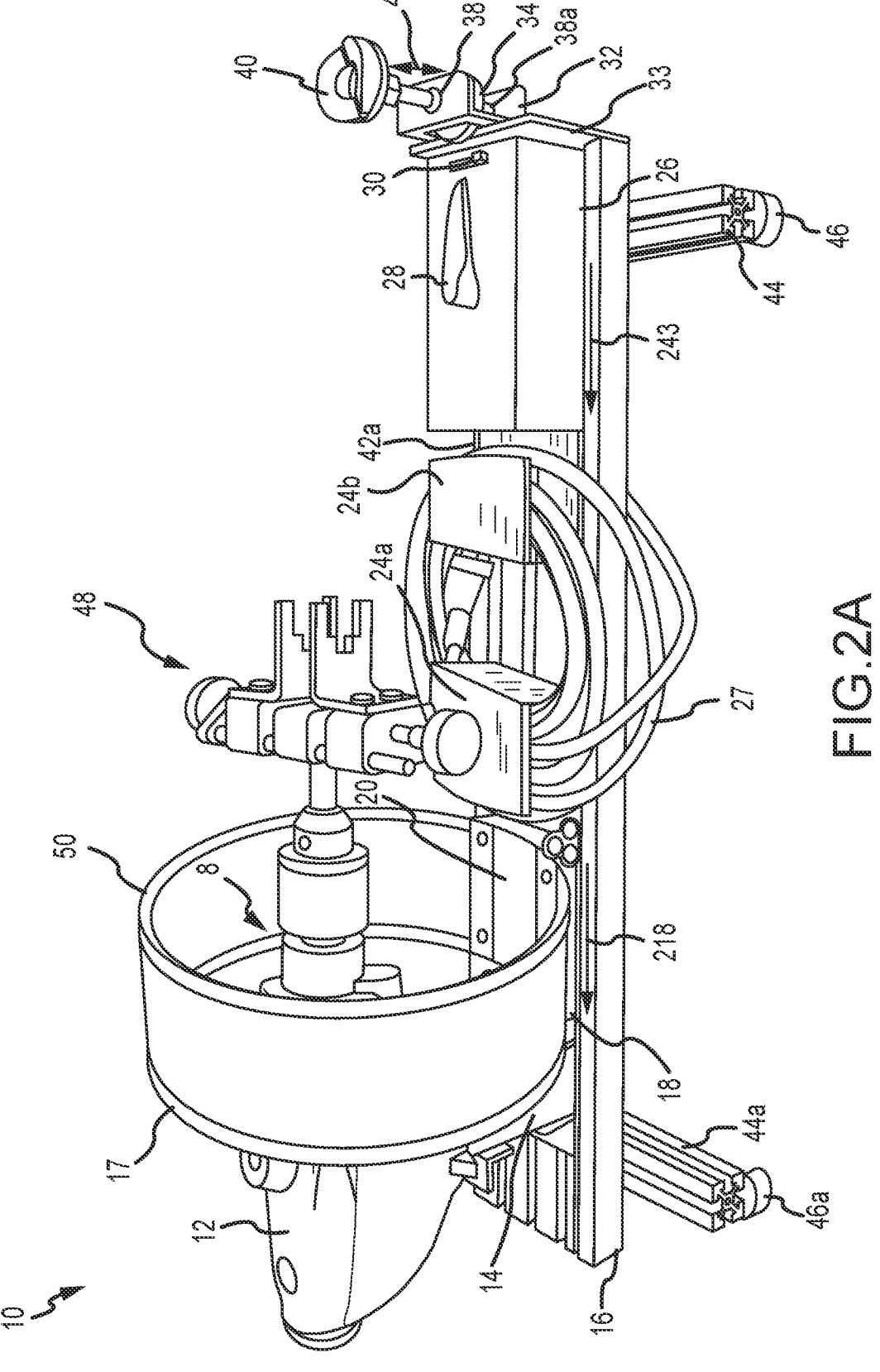
FIGS. 2A and 2B illustrate the system of FIG. 1 in first and second non-operational states that the system would be placed in post or prior to use of the system to adjust a wrench.
Figure 2B:
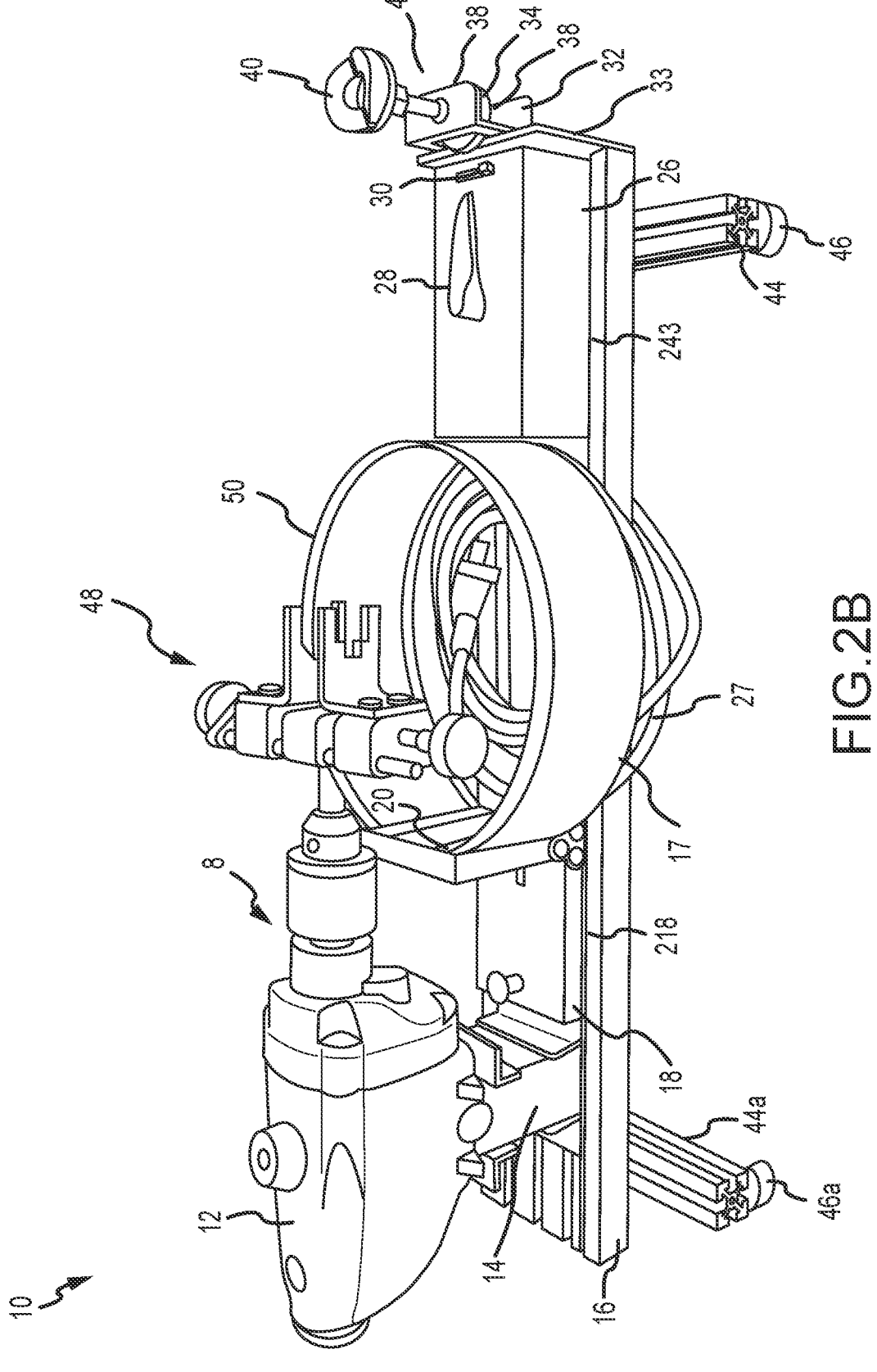

FIGS. 2A and 2B illustrate the system 10 of FIG. 1 in first and second non-operational states that the system 10 would be placed in (by a human operator, not shown) post or prior to use of the system to adjust a wrench. More specifically, FIG. 2A illustrates the system 10 of FIG. 1 after (or immediately before) the system 10 has been in the operable position or state shown in FIG. 1. The guard 17 has been slid backward toward the motor 12 by sliding block 18 as shown with arrow 218 on base 16, and the wrench 2 has been removed (e.g., slid outward from the motor 12) after operating the adjustment knobs 50 to release the wrench head 8 from the jaws of the chuck 48. The movement of the block 18 also causes the member or half 24a of the cord keeper assembly 24 to be moved away from the member or half 24b, and with the cord keeper assembly 24 in this retracted position of block 18 and hence member 24a causes a somewhat oblong spool to be defined between members 24a and 24b with its major diameter less than an inner diameter of the guard 17. As shown, the cord 27 is then wrapped around the keep members 24a, 24b for ease of storage.

To further facilitate compact storage, the sliding arms 42, 42a are slid inward or toward the motor 12 as shown with arrow 243, which causes the rest 40 and its mounting bracket 33 to be positioned in a retracted position proximate the control box 26 (e.g., with bracket 33 abutting or contacting the box 26). This reduces the overall length of the system 10 to assist in storage in more compact spaces. As shown in FIG. 2B, the guard 17 can then be placed in its storage position or state (e.g., a down, horizontal position with its central axis perpendicular to the upper planar surface of the base 16). This is achieved by pivoting the mounting block 20 about its pivot point on the base 16 (with the block 20 being pivotally attached to the upper surface of the base 16). In this position, the guard 17 encircles the cord 27 position upon the cord keeper assembly 24, and the overall height of the system 10 is reduced to facilitate storage.

Figure 3:
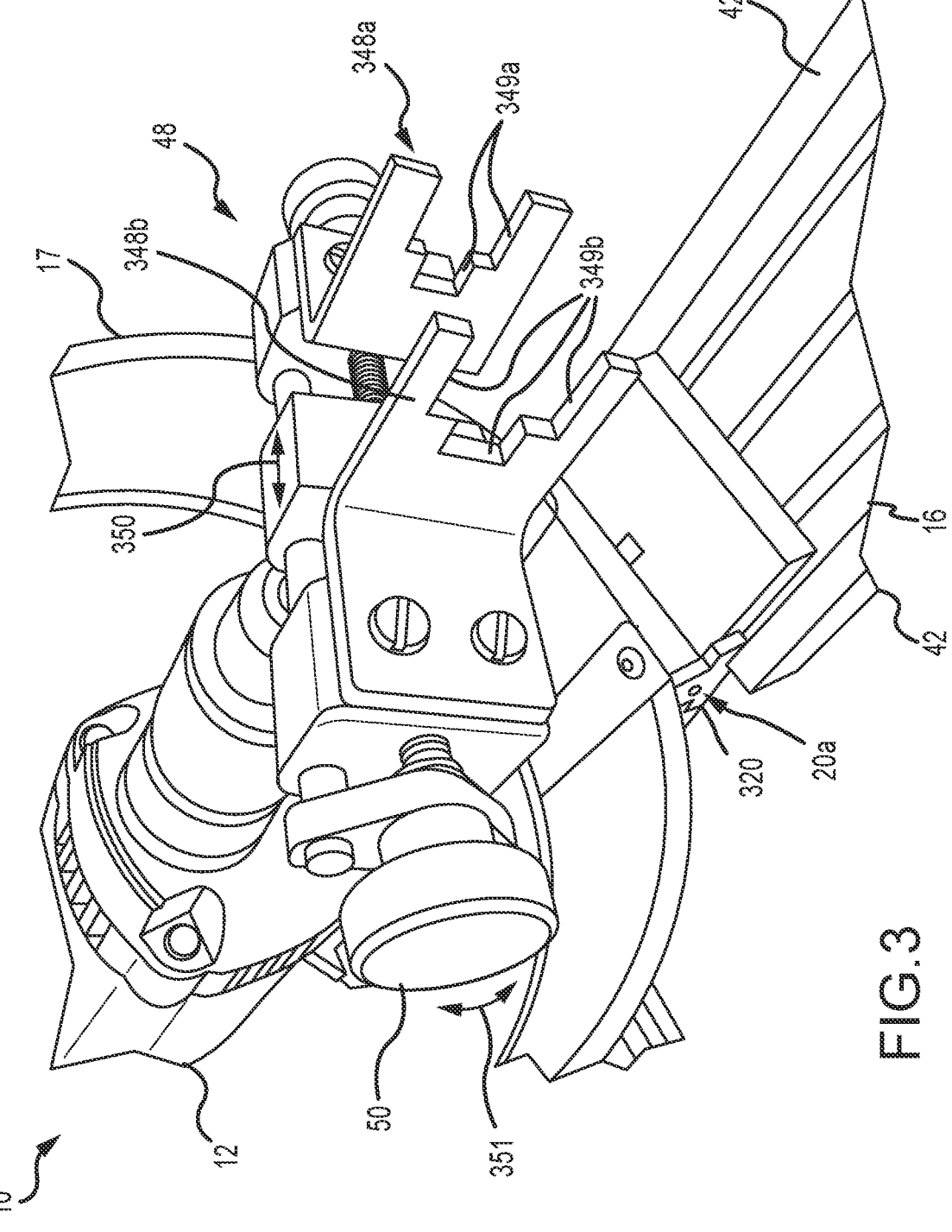
FIG. 3 illustrates an enlarged view of a portion of the system of FIG. 2A showing the adaptive chuck in further detail.

FIG. 3 illustrates an enlarged view of a portion of the system 10 in the operating state shown in FIG. 2A. FIG. 3 is useful for showing the pivotal guard mounting block 20 that is pivotally attached to guard support block 18 via hinge 320 to pivot about point 20a and to allow the guard 17 to be moved to the horizontal storage position shown in FIG. 2B and back up into the vertical pre or post nonoperational position shown in FIGS. 2A and 3.

Also, FIG. 3 shows additional details of the adaptive chuck 48 and its adjustment knob 50. As shown, the chuck 50 includes left and right jaws 348a, 348b, which are planar in this example and include two or more differently sized rectangular (or square) slots 349a, 349b for receiving two or more differently sized drivers (e.g., each of the conventional drive sizes for click type torque wrenches). To operate the chuck 48, an operator would open the chuck jaws 348a, 348b by rotating 351 one of the adjustment knobs 50 to further or fully space apart the jaws 348a, 348b, with their movement shown by arrows 350. A head or driver end of a torque wrench would then be inserted between the jaws 348a, 348b, and one of the knobs 50 rotated 351 to cause the jaws 348a, 348b to close (e.g., to concurrently move 350 toward each other) until the head of the wrench is captured/restrained with its driver in an appropriate or similarly sized one of the slots 349a, 349b. The chuck 48 is configured to be self-centering with both jaws 348a, 348b moving a similar distance and direction with rotation 351 of either adjustment knob 50. The chuck 48 is an exemplary configuration but nearly any chuck may be used with ones that are self-centering and configured for multiple driver sizes being preferred for system 10. Because of the geometry, it is not necessary for the chuck to a have clamping force upon the head of the wrench in order for the torque from the motor to be effectively transmitted. As shown, the center of the chuck 48 is mated with the output or drive shaft of the motor 12.

Figure 4:
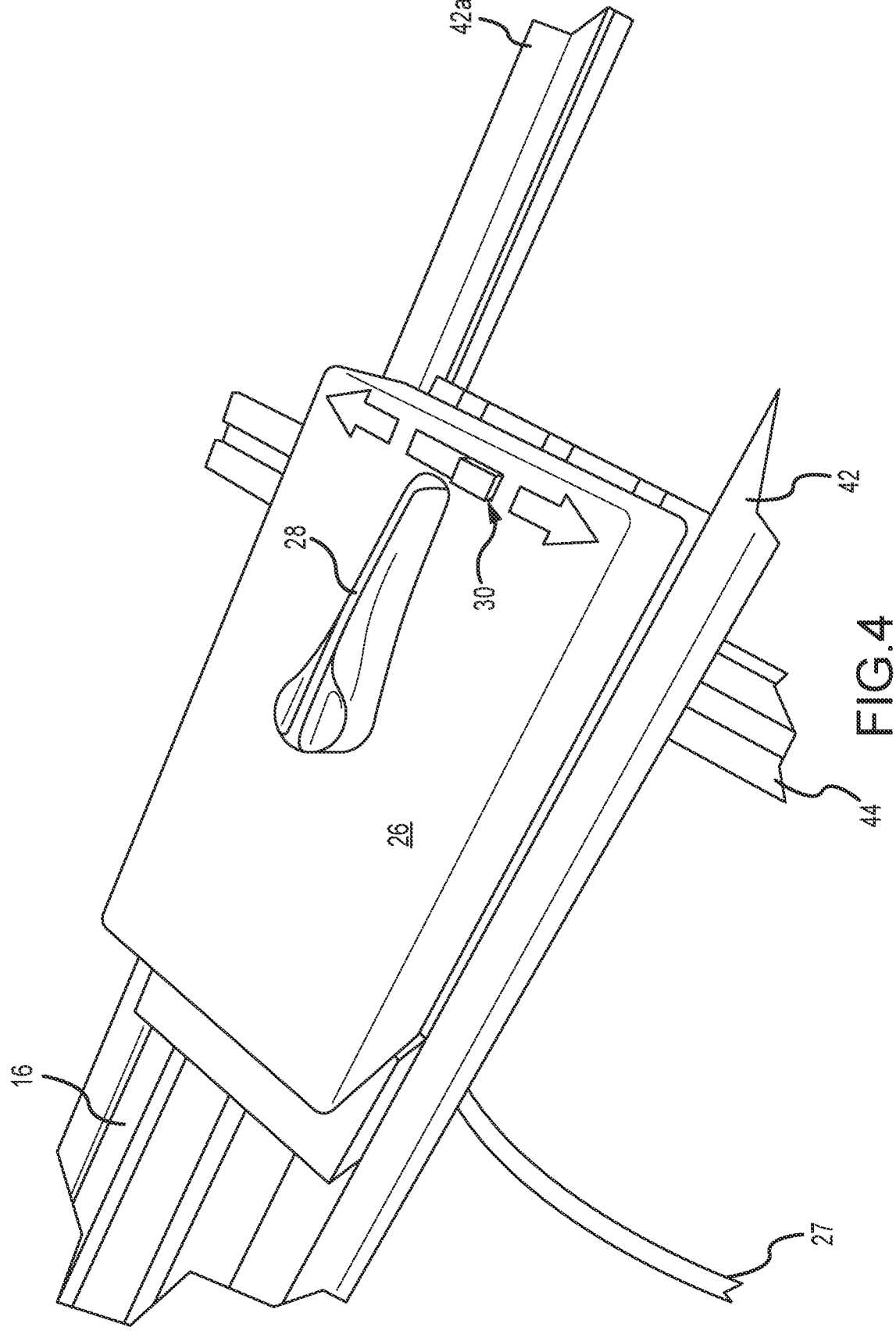
FIG. 4 is an enlarged view of the controller or control box of the system of FIG. 1.

FIG. 4 is an enlarged view of the controller or control box 26 of the system 10 of FIG. 1. As shown, the control box 26 is mounted to the upper surface of the base 16 between the slidable arms 42, 42a, with a power cord 27 being connected to internal components at one end to provide power to a system driver/motor (with the other or plug end connected to a power source). An operator uses the system including controller/control box 26 by moving the lever or switch 30 to the load or unload position, which causes the controller 26 to switch or set the direction of the motor/driver to rotate its output or drive shaft (and the interconnected chuck) in the clockwise or counterclockwise direction.

With the direction switch/lever 30 in a desired position, the operator may then move or rotate the motor power lever 28 in either direction (clockwise or counterclockwise or left or right) to control the speed of the motor/driver via internal components of the controller/control box 26, which are coupled with the speed control components of the variable speed motor of the system 10. In this example, the motor power lever 28 is shown in the off (or zero rotation) position, and movement in either direction will cause the speed of rotation provided by the motor to increase (in the direction chosen or set by switch/lever 30).

Figures 5A, 5B:
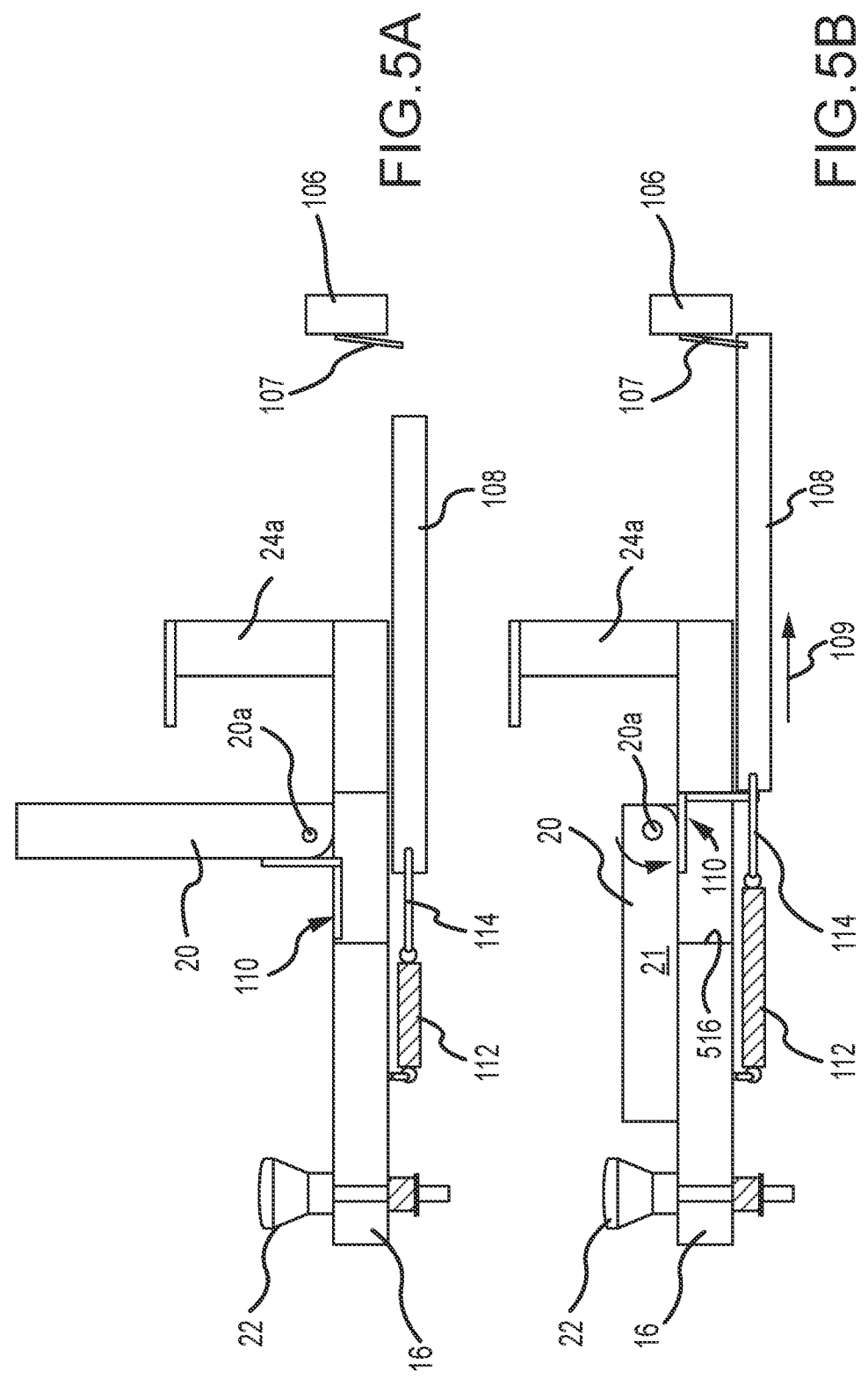
FIGS. 5A and 5B are side schematic views of the guard section of the system of FIG. 1 showing, respectively, the guard in the positions shown in FIGS. 2B and 1.

FIGS. 5A and 5B are side schematic views of the guard section of the system 10 of FIG. 1 showing, respectively, the system 10 configured or manipulated to have the guard in the positions shown in FIGS. 2B and 1. These figures show the motion 109 of a pushrod 108 when the guard pivot block 20 is rotated 21 about pivot point 20a. Particularly, FIG. 5A shows the pivotable guard mounting block 20 in the down, horizontal position for the interconnected guard (not shown in FIGS. 5A and 5B but understood from FIGS. 1-4). The block 20 can be pivoted from this position to the position shown in FIG. 1, with the L-shaped pushrod lever 110 rotating too within a groove or slot 516 in the base 16, which is sized and shaped to allow a lower member or arm of pushrod lever 110 to swing without interference through the base 16 (with an upper member or arm of the pushrod lever 110 attached to a lower portion of a side of the block 20 that faces the motor with the block 20 in its upright, vertical position shown in FIG. 5A).

As shown, the system 10 includes a pushrod 108 disposed in a groove or channel (element 116 in FIG. 7) in the upper surface of the base 16 and extending between the block 18 and the control box/controller 26 and, more specifically, a momentary switch 106 of the controller 26 (or housed in the control box 26). When the slidable guard mounting block 18 is pushed outward from the motor 12 and fully toward the controller 26 as shown in FIGS. 5A and 5B (e.g., such that the guard 17 attached to block 20 is in its upright, vertical position and surrounding the chuck 48), the pushrod 108 is held in a spaced apart position from the momentary switch lever 107 and momentary switch 106, via a keeper 114 coupled to the end of the pushrod 108 and a return spring 112, which is attached at one end to the bottom of the block 18 and at a second end to the keeper 114. In this state shown in FIG. 5A, the momentary switch 106 acts to interrupt the power (or control) circuit of the controller 26 such that it is inoperable (e.g., cannot be operated to provide power to the motor 12).

However, as shown in FIG. 5B, the block 20 (with guard 17, not shown) can be pivoted from a guard down position to a guard upright position. This rotation or pivoting 21 causes the lever 110 to also rotate or pivot, and the lever (or its extended arm) contacts an end of the pushrod 108 applying a force (greater than the retention force provide by spring 112) causing it to slide 109 into contact with the momentary switch lever 107 so as to operate the switch 106 and complete the power (or control) circuit of the controller 26 to allow it to be operated to provide power to the motor 12. In this way, the device 10 is configured with a safety feature to only be operable with the guard 17 properly position in its upright, vertical position and slid linearly away from the motor 12 to enclose the chuck 48. It is to be understood that FIG. 5A and FIG. 5B only show a portion of the arrangement for clarity, as block 16 would have also traveled a sufficient distance towards switch 106.

Figure 6A:
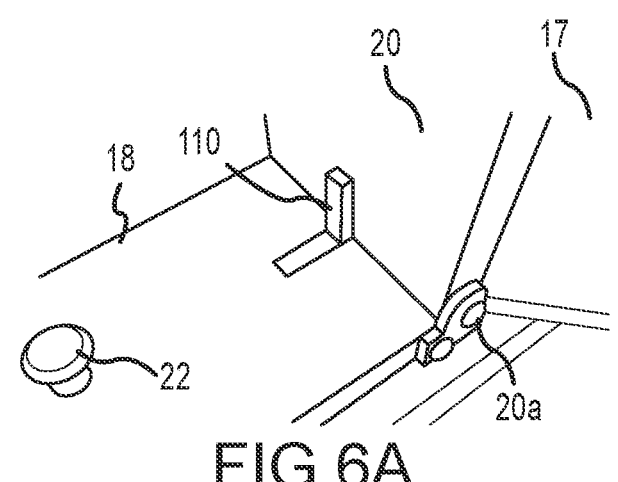
FIGS. 6A and 6B illustrate the pivotable guard mounting block of FIGS. 5A and 5B in further detail showing operation of the pushrod lever.
Figure 6B:
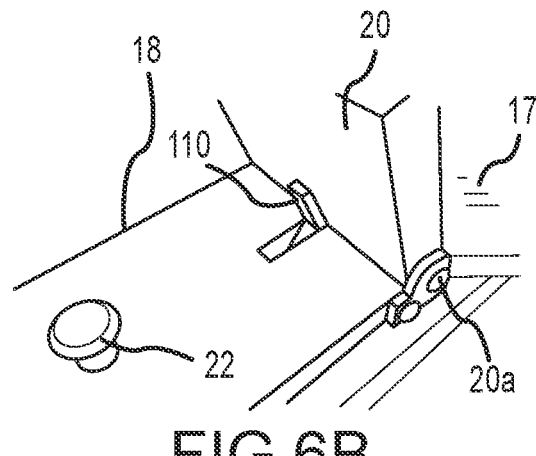
Figure 7:
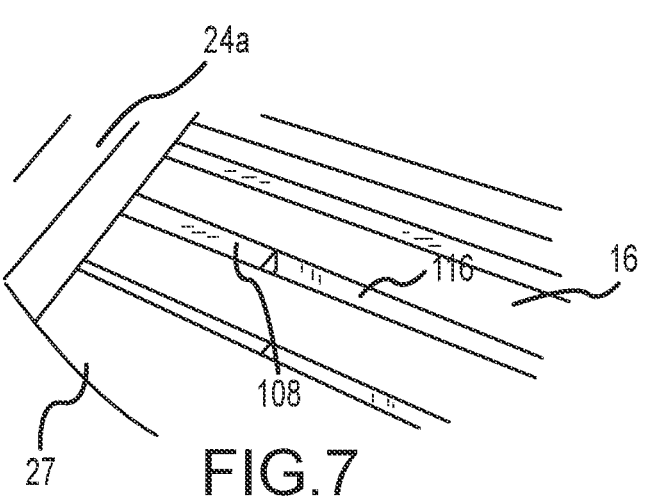
FIG. 7 is a partial top view of the system of FIG. 1 illustrating the pushrod location in the base in further detail.

FIGS. 6A and 6B illustrate the pivotable guard mounting block 20 of FIGS. 5A and 5B in further detail showing operation of the pushrod lever 110. As shown in FIG. 6A, the block 20 is pivoted about point 20a away from the slidable guard support block 18 such that the pushrod lever 110 is in a disengaged position apart from the end of the pushrod 108. In FIG. 6B, the block 20 is being initially pivoted about point 20a toward the block 18, which causes the pushrod lever 110 to move through the block 18 toward the end of the pushrod 108. FIG. 7 is a partial top view of the system 10 of FIG. 1 illustrating the pushrod location in the base 16 in further detail. Particularly, the pushrod 108 is disposed within a pushrod channel 116 in the upper surface of the base 16, and, as discussed with reference to FIG. 5A-6B, the system 10 is configured such that the pushrod 108 moves with the slidable block 18 on the base 16 toward and away from the controller and momentary switch 106 and its lever 107, with the remaining separation distance being controlled by pivoting of the guard 17 and pivotable guard support block 20 to cause contact between the pushrod lever 110 and the end of the pushrod 108.

Figure 8:
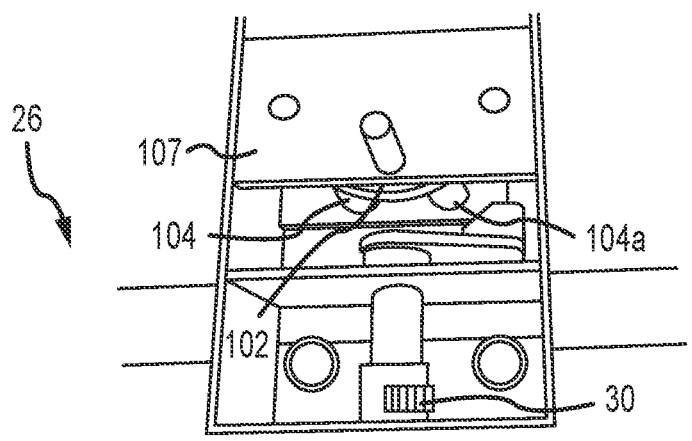
FIGS. 8 and 9 are top perspective views of the controller of the system of FIG. 1 with the top cover removed to show various internal components and their operations in more detail.
Figure 9:
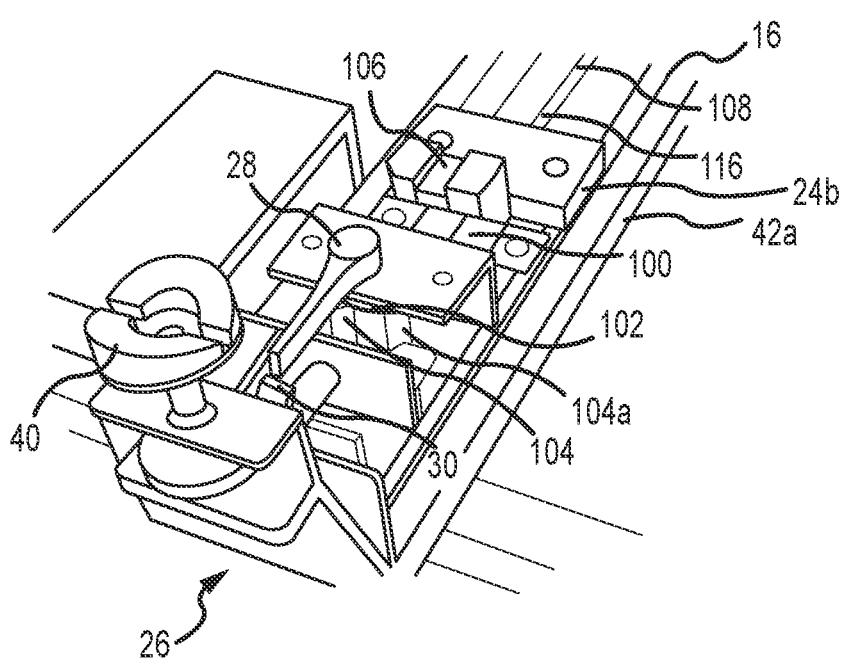

FIGS. 8 and 9 are top perspective views of the controller 26 of the system 10 of FIG. 1 with the top cover removed to show various internal components and their operations in more detail. As shown, the controller includes a motor directional switch 30 that is operable by an operator to set the direction of rotation of the motor 12 when power is applied by the controller 26. To apply power, the controller 26 includes a motor switch 100 that can be selectively interconnected and operated by the momentary switch 106 depending upon the proper location of the pushrod 108 in channel 116 (as discussed above) to complete an electric or power circuit in controller 26.

The speed of the motor 12 is controlled, in this non-limiting example, by movement of the motor power lever 28 in either direction to move a crank arm 102 that is coupled or attached to crank arm rollers 104, 104a such that movement of the lever 28 in either direction causes variable power to be applied to the motor 12 by the controller 26 (and, hence, to rotate the motor output or drive shaft and coupled chuck 48 at variable speeds). In this prototype, the control was based on a trigger mechanism of a conventional hand drill with its trigger, but the controller 26 can be designed and implemented in many other ways to provide the directional and variable speed functions taught with controller 26 of FIGS. 8 and 9.

Figure 10:
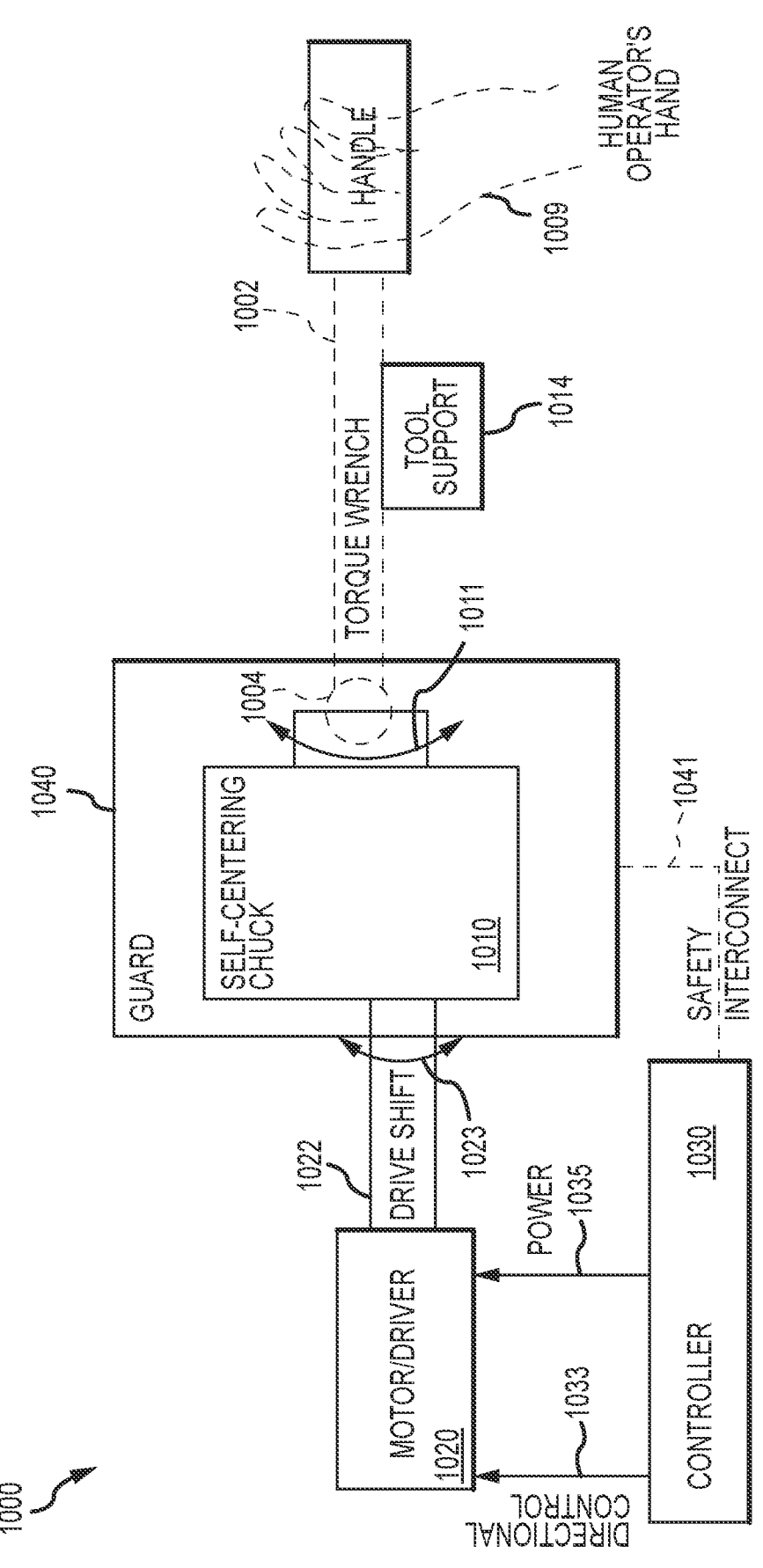
FIG. 10 is a functional block diagram torque value adjustment system of the present description such as but not limited to that shown in FIGS. 1-9.

FIG. 10 is a functional block diagram torque value adjustment system 1000 of the present description such as but not limited to that shown in FIGS. 1-9. As discussed with reference to the system 10 of FIGS. 1-9, the illustrated system 10 provided one approach to implementing the inventor's concepts via a useful, working prototype. However, one skilled in the arts will readily be able to use a variety of other components and configurations to achieve similar functionality such that it is useful to describe more generally some of these inventive features with reference to system 1000 of FIG. 10.

As shown, the system 1000 includes a self-centering chuck 1010 that is configured for receiving and retaining a range of torque wrench heads (with varying drive sizes). This is shown with the click type torque wrench 1002 having its head or driver end 1004 received within the chuck 1010. The system 1000 includes a tool support 1014 that is configured to support the body of the wrench 1002 in alignment with the drive or output shaft 1022 of the motor/driver 1020 (e.g., parallel to the shaft 1022 or with the two longitudinal axes coinciding). During operations to adjust torque of the wrench 1002, a human operator would grasp the handle of the wrench as shown with hand 1009, while concurrently releasing or working the wrench's locking mechanism (not shown in FIG. 10 but being understood as being an end device, a lock ring, or the like located proximate to the handle for ease of operation while holding the handle).

The system 1000 also includes a motor or driver 1020 with an output or drive shaft 1022 that is coupled to the chuck 1010 such that when the shaft 1022 rotates as shown with arrows (in either a clockwise or a counterclockwise direction) 1023 the chuck 1010 (and received wrench head or driver end 1011) also rotates as shown with arrows 1011. The motor or driver may take many forms to implement the system 1000 such as a conventional electric motor with the ability to rotate in either direction and, typically but not always, with varying speeds. In other implementations, the motor 1020 may be a stepper motor or other digitally controlled motor configured for responding to control signals to rotate the shaft 1022 and wrench head 1004 a selected number of turns.

To operate the motor 1020, the system 1000 includes a controller 10310 that provides control signals setting the rotation direction of the shaft 1022 as shown at 1033 and that provides control signals setting the speed of the rotation 1023 (and, in the case of a stepper motor or other digitally controlled driver 1020, setting the number of rotations of the chuck 1010 and any received wrench head 1004). In the case of a manual control of speed, a human operator would rotate a lever or knob (as discussed for system 10) or otherwise adjust the speed control, and the controller 1030 is configured to respond by adjusting the power provided to the motor 1020 as shown at 1035. In the case of a digital control, the human operator may input the current torque setting of the wrench 1002 and a desired new or final setting, and the controller 1030 may be configured to convert this to a direction (load or unload, for example, set by signal 1033) and a number of rotations (at one or more speeds to achieve the new torque value from the present value such as 4 turns per 10 foot pounds or the like).

The system 1000 also includes one or more safety features. A guard 1040 is provided that is positioned so as to at least partially enclose or block access to the chuck 1010. The system 1000 may further be configured to include a safety interconnect 1041 between the guard 1040 and the controller 1030 such that the controller 1030 only will provide operating signals (e.g., power) 1035 to the motor 1020 when the guard 1040 is in a predefined position (or defined range of positions) relative to the chuck 1010. This may be in the extended linear position combined with the vertical, upright position as discussed relative to the guard 17 in system 10 of FIG. 1. The safety interconnect 1041 may be provided via mechanical linkages or couplings as discussed above or may be provided using one or more sensors (not shown but well understood in the arts).

Figure 11:
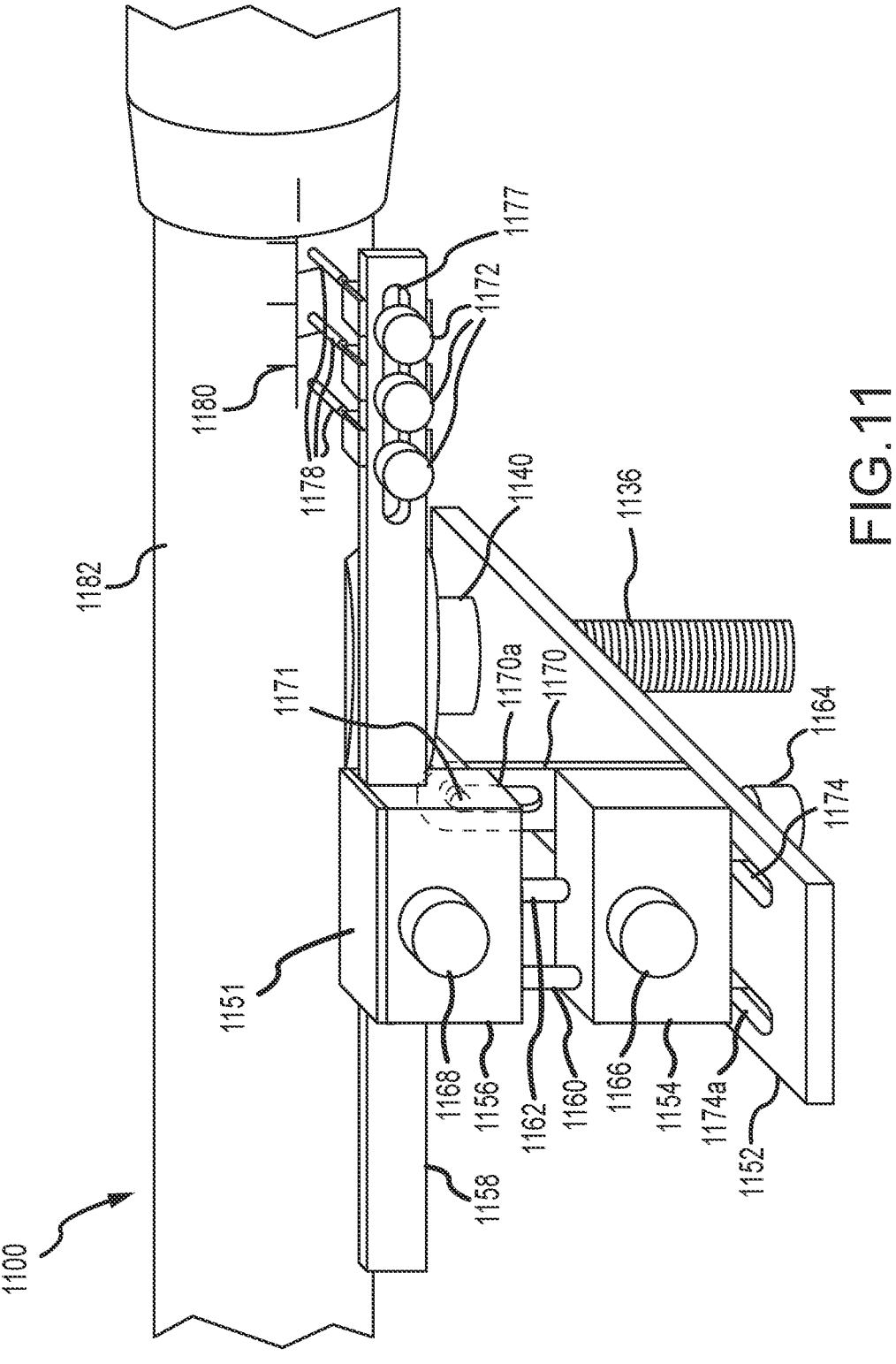
FIG. 11 is a side perspective view of a position indicator assembly that may be include in the systems of the present description to allow an operator to readily determine the present torque value during an adjustment operation/process.

FIG. 11 is a side perspective view of a position indicator assembly 1100 that may be include in the systems of the present description to allow an operator to readily determine the present torque value during an adjustment operation/process (operations of the systems described herein). In brief, the assembly 1100 can be provided or mounted on the base of the system such as via a connection with the tool rest 1140 and/or the height adjustment screw 1136, and it is useful for obtaining a visual indication of the present torque value (or torque value setting) of a wrench placed on the tool rest 1140.

As shown, the assembly 1100 includes an indicator assembly support bar or arm 1152 that may be pivotally or rigidly coupled to the bottom portion of the tool rest 1140 or a top portion of the height adjustment screw 1136. This allows the assembly 1100 to be positioned relatively close to a torque wrench body 1182 received on the rest 1140 and, more importantly, relatively close or proximate to the wrench's micrometer barrel increment marks 1180, which are used to show the present torque value of the wrench (relative to the inner portion of the handle or the like).

With this proximate positioning to the wrench body 1182, the assembly 1100 is configured to allow a user to adjust the positioning (horizontal and vertical positions) of a set of indicator needles 1178 to place them immediately adjacent to the increment marks 1180 (as shown in FIG. 11). To this end, the assembly 1100 includes an indicator bar lower support block 1154 that is slidingly attached, e.g., with pins 1160 and 1162 extending from the upper support block 1156 through the lower support block 1154, to the support bar 1154 such that its lateral or horizontal position can be adjusted, via rotation of a lateral adjustment thumb screw 1164 in this example (which may couple on an opposite end with a travel limiter 1170), to move an indicator bar 1158 laterally or horizontally toward and away from the wrench body 1182 (and tool rest 1140). The indicator bar 1158 supports the indicator needles 1178 via needle support members 1172 (e.g., thumb screws or the like to allow fine tuning of horizontal positions of the indicator needles 1178 relative to the indicator bar 1158 and marks 1180), To facilitate vertical adjustments to indicator needles 1178, the assembly 1100 provides an indicator bar upper support block 1156 that is coupled via a guide pin 1160 and a clamping pin 1162 to the lower support block 1154, whereby the upper support block 1156 moves laterally with the lower support block 1154 on support bar 1152. The pins 1160 and 1162 allow vertical travel relative to the lower support block 1154 when the indicator bar thumb screw 1168 is rotated, which also sets the vertical position of the indicator bar 1158. Vertical travel may be limited or controlled through the use of an upper support block travel limiter 1170 that, in this example, includes a travel limiter slot 1170a that would mate with a pin 1171 or the like on the rear or inner side of the block 1156.

The indicator bar 1158, as shown, supports a set of indicator needles 1178, e.g., one or more elongated elements useful for providing visual indication of the current torque value set for the wrench. As shown, the lateral position of the indicator needles 1178 may be separately set via rotation of the thumb screws 1172, which are supported in a slot/groove 1177 in the indicator bar 1158. This allows the side-to-side spacing of the indicator needles to be set by a user to provide desired visual indication or guidance to torque value adjustments. In the assembly 1100, three indicator needles 1178 are provided to provide a visual reference with micrometer barrel increment marks 1180, and it may be useful for the two end needles 1178 to be separated by 1 inch, with the middle indicator needle 1178 centered there between (i.e., at 0.5-inch offsets). In this way, the needle indicators 1178 will provide an operator with useful visual information to align the end of the handle with appropriate torque values during operation of the systems that include the assembly 1100.

In review and as shown in FIG. 11, the position indicator assembly 1100 has an arrangement or configuration that allows the operator to more accurately determine the position of the edge of the micrometer barrel in relation to the increment marks 1180 on torque wrench body 1182, as these marks are in rotation and difficult to see while the device is being operated. Position indicator assembly 1100 is slidably mounted on support bar 1152, with indicator assembly support bar 1152 itself being fixably mounted to adjustment screw 1136 (which may correspond with adjustment screw 36 in FIG. 1).

Lower support block 1154 is allowed to move in a lateral direction, with relation to torque wrench body 1182, by means of lateral adjustment slots 1174 and 1174a. Guide pin 1160 is fixably mounted to lower support block 1154 and sufficiently extends past lateral adjustment slot 1174a such that it can remain engaged with the slot. Guide pin 1160 is allowed to move freely within guide pin slot 1174a, whilst lateral adjustment thumb screw 64 can move freely within lateral adjustment slot 1174. Tightening of thumb screw 1164 against indicator assembly support bar 1152 allows lower support block 1154 to be held securely in a desired position along the bar.

Slidably mounted atop lower support block 1154 is upper support block 1156. Clamping pin 1162 is fixably mounted to upper support block 1156 and extends into lower support block 1154, where it is allowed to slidably move. Guide pin 1160 extends upwardly beyond lower support block 1154 and into upper support block 1154, which has the ability to slidably move in a vertical direction about guide pin 1160. Vertical adjustment thumb screw 1166 is provided to apply force against clamping pin 1162 and allows the upper support block to be held in a desired vertical position above indicator assembly support bar 1152. Since it typically would be undesirable for the upper support block 1156 to disengage from lower support block 1154, an upper support block travel limiter 1170 is fixably mounted to lower support block 1154. Upper support block 1156 is provided with stop pin 1171, which engages with travel limiter slot 1170a.

Slidably mounted to upper support block 1156 is indicator bar 1158. Indicator bar thumb screw 1168 is provided to apply force against indicator bar 1158 so as to allow it to be securely held in a desired longitudinal position with relation to torque wrench body 1182. Indicator needle adjustment slot 1177 allows indicator needles 1178 to move such that they can be aligned with increment marks 1180 on torque wrench body 1182. Indicator needle adjustment thumb screws 1172 are provided to securely hold the position of indicator needles 1178 once aligned with selected increment marks 1180.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A system for adjusting a torque value of a click type torque wrench, comprising:
   a chuck configured for receiving and retaining a head of the click type torque wrench, the click type torque wrench having an integral wrench body, a handle at an end of the wrench body, and a locking mechanism proximate the handle;
   a motor with a drive shaft coupled to the chuck; and
   a controller configured to control the motor, wherein the controller, in response to an input from a user, causes the motor to rotate in a user-selectable direction to rotate the drive shaft such that the chuck, the received head of the click type torque wrench, and the integral wrench body rotate to adjust the torque value of the click type torque wrench with the locking mechanism in a released position.

2. The system of claim 1, wherein the chuck is self-centering and includes jaws with one or more slots configured for receiving one or more differently sized drivers on the head.

3. The system of claim 1, further comprising:
   a base supporting the chuck and the motor from a top surface; and
   a tool support configured to support the wrench body at a location proximate to the handle in a parallel alignment with the drive shaft of the motor.

4. The system of claim 1, further comprising a guard with a hollow cylindrical body.

5. The system of claim 4, further comprising a base supporting the chuck and the motor from a top surface,
   wherein the guard is pivotally coupled with the base so as to be pivotable between a horizontal position in which the guard is spaced apart from the chuck and a vertical position in which the hollow cylindrical body extends about the chuck at least partially blocking access to the chuck.

6. The system of claim 5, further comprising a safety interconnect between the guard and the controller, the safety interconnect configured to enable rotation of the motor only when the guard is in the vertical position.

7. The system of claim 6, wherein the guard is further supported on the base to be slidable between a first linear position proximate to the motor and a second linear position spaced apart from the motor and proximate to the chuck and wherein the safety interconnect is configured to only enable operation of the motor when the guard is in the second linear position and is in the vertical position.

8. The system of claim 7, further comprising a block configured for sliding upon the base,
   wherein the guard is pivotally supported on the block,
   wherein the safety interconnect comprises a momentary switch for completing a circuit in the controller and a pushrod housed in a channel in the base, and
   wherein the pushrod is moved into contact with the momentary switch only when the block is slid to move the guard to the second linear position and the guard is pivoted into the vertical position.

9. The system of claim 1, wherein the motor comprises a stepper motor, and the controller is configured to provide a digital control signal to cause the motor to rotate the drive shaft a predefined number of turns to set the torque value of the click type torque wrench.

10. The system of claim 1, further comprising:
    a tool support configured to support the wrench body at a location proximate to the handle in a parallel alignment with the drive shaft of the motor; and
    a position indicator assembly with at least one indicator needle at a vertical and horizontal position relative to the tool support that is configured for providing visual indication of a location of the handle relative to a set of micrometer barrel increment marks on the wrench body of the click type torque wrench.

11. The system of claim 10, wherein the position indicator assembly includes at least one support block and at least one screw to adjust the vertical and horizontal position of the at least one indicator needle to place the at least one indicator needle adjacent a user-selectable torque value in the set of micrometer barrel increment marks.

12. A system for adjusting a torque value of a click type torque wrench, comprising:
    a driver for receiving and retaining a head of the click type torque wrench;
    a controller configured to control the driver to rotate the head to adjust the torque value of the click type torque wrench; and
    a guard with a hollow cylindrical body, wherein the guard is pivotally coupled with a base so as to be pivotable between a horizontal position in which the guard is spaced apart from an output portion of the driver and a vertical position in which the hollow cylindrical body extends about the output portion of the driver.

13. The system of claim 12, further comprising a safety interconnect between the guard and the controller configured to enable operation of the driver only when the guard is in the vertical position.

14. The system of claim 13, wherein the guard is further supported on the base to be slidable between a first linear position proximate to the driver and a second linear position spaced apart from the driver and proximate to a chuck, and wherein the safety interconnect is configured to enable operation of the driver only when the guard is in the second linear position and is in the vertical position.

15. The system of claim 14,
wherein the guard is pivotally supported on the block,
wherein the safety interconnect comprises a momentary switch for completing a circuit in the controller and a pushrod housed in a channel in the base, and
wherein the pushrod is moved into contact with the momentary switch only when the block is slid to move the guard to the second linear position and the guard is pivoted into the vertical position.

16. The system of claim 12, wherein the driver includes a motor and a chuck that is self-centering and includes jaws with two or more slots configured for receiving two or more differently sized drivers on the head.

17. A system for adjusting a torque value of a click type torque wrench, comprising:
a chuck configured for receiving and retaining a head of the click type torque wrench, the click type torque wrench having an integral wrench body and a handle at an end of the wrench body;
a motor with a drive shaft coupled to the chuck;
a base with a top surface supporting the chuck and the motor; and
a tool support configured to support the wrench body at a location proximate to the handle in a parallel alignment with the drive shaft of the motor.

18. The system of claim 17, wherein the chuck is self-centering and includes jaws with two or more slots configured for receiving two or more differently sized drivers on the head.

19. The system of claim 17, further including a guard with a hollow cylindrical body, wherein the guard is pivotally coupled with the base so as to be pivotable between a horizontal position in which the guard is spaced apart from the chuck and a vertical position in which the hollow cylindrical body extends about the chuck at least partially blocking access to the chuck.

20. The system of claim 17, further comprising a controller configured to control the motor, wherein the controller, in response to an input from a user, causes the motor to rotate in a user-selectable direction to rotate the drive shaft such that the chuck, the received head of the click type torque wrench, and the integral wrench body are rotated to adjust the torque value of the click type torque wrench with the locking mechanism in a released position.

21. The system of claim 20, further including:
a guard supported on the base, the guard slidable between a first linear position proximate to the motor and a second linear position spaced apart from the motor and proximate the chuck; and
a safety interconnect between the guard and the controller, wherein the safety interconnect is configured to enable operation of the motor only when the guard is in the second linear position and is in the vertical position.

22. The system of claim 21, further comprising a block configured for sliding upon the base,
wherein the guard is pivotally supported on the block,
wherein the safety interconnect comprises a momentary switch for completing a circuit in the controller and a pushrod housed in a channel in the base, and
wherein the pushrod is moved into contact with the momentary switch only when the block is slid to move the guard to the second linear position and the guard is pivoted into the vertical position.

23. The system of claim 17, wherein the motor comprises a stepper motor, and the system further comprises:
a controller configured to provide a digital control signal to cause the motor to rotate the drive shaft a predefined number of turns to set the torque value of the click type torque wrench.

* * * * *